United States Patent [19]
Sigle et al.

[11] Patent Number: 5,158,243
[45] Date of Patent: Oct. 27, 1992

[54] SINGLE WIRE DISPENSING ASSEMBLY

[75] Inventors: Ernest R. Sigle, R.R. #1, Box 30A, Council Grove, Kans. 66846; Christian P. Sigle, Council Grove, Kans.

[73] Assignee: Ernest R. Sigle, Council Grove, Kans.

[21] Appl. No.: 599,744

[22] Filed: Oct. 19, 1990

[51] Int. Cl.⁵ .................... B65H 49/36; B65H 49/00
[52] U.S. Cl. ............................ 242/86.50 R; 242/85.1
[58] Field of Search ................ 242/86.5 R, 86.7, 85, 242/86.52, 85.1

[56] References Cited

U.S. PATENT DOCUMENTS

| | | | |
|---|---|---|---|
| 2,789,778 | 4/1957 | Zogg et al. | 242/86.7 |
| 2,896,877 | 7/1959 | Vaughn | 242/86.5 R |
| 3,107,878 | 10/1963 | Wong | 242/86.7 |
| 3,394,903 | 7/1968 | Rom | 242/86.5 R |
| 3,544,031 | 12/1970 | White | 242/86.5 R |
| 3,937,414 | 2/1976 | Bank et al. | 242/86.5 R |
| 4,208,021 | 6/1980 | Wall | 242/86.5 R |
| 4,364,701 | 12/1982 | Lynch et al. | 242/86.5 R |
| 4,648,769 | 3/1987 | Stirling | 242/86.5 R |

Primary Examiner—Daniel P. Stodola
Assistant Examiner—John Q. Nguyen
Attorney, Agent, or Firm—Phillip A. Rein

[57] ABSTRACT

A single wire dispensing assembly having two embodiments being 1) a hitch pull wire dispensing assembly operable connected to a hitch member on a vehicle; and 2) an operator pull wire dispensing assembly not requiring an external power source. The hitch pull wire dispensing assembly includes a trailer hitch connector assembly having a spindle support assembly mounted thereon. The spindle support assembly includes a concave spool support disc having a central upright extending support axle to receive a spool of wire. The spool support disc is provided with an upper concave contact surface to provide frictional resistance to the unraveling of a spool of wire mounted thereon. The operator pull wire dispensing assembly includes a handle and wheel support assembly having a spindle support assembly connected thereto. The main handle assembly is used to push and pull the entire structure manually.

The handle assembly is pivoted upwardly to place the support shaft in a position horizontal to a ground support surface and supported on a support surface on the spool support disk in contact with the ground support surface for ease of loading and unloading a spool of wire on the support shaft.

1 Claim, 2 Drawing Sheets

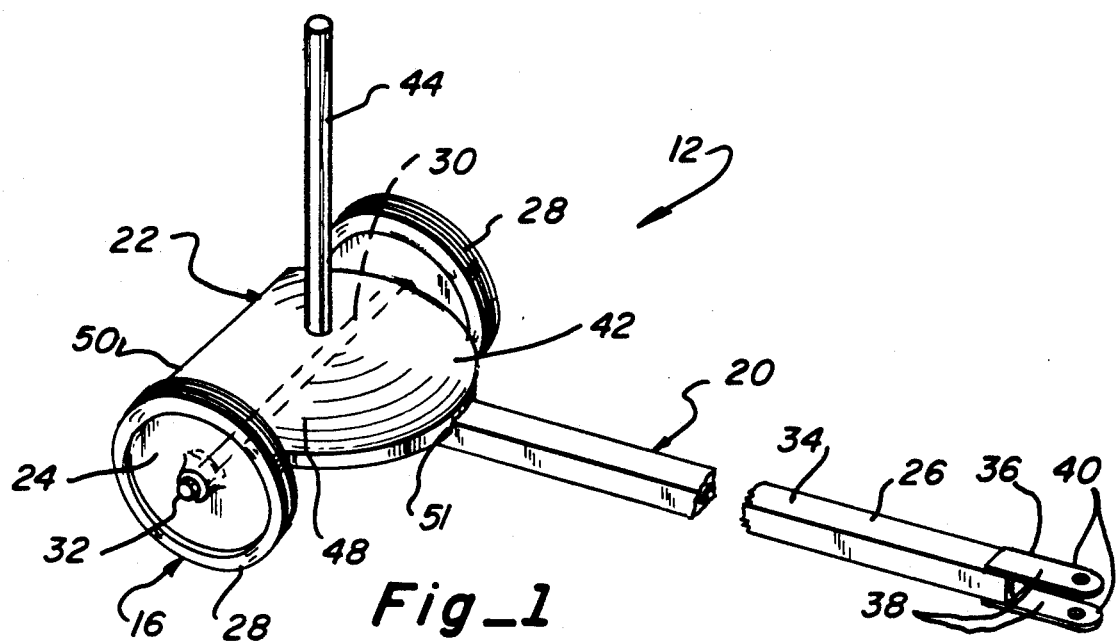
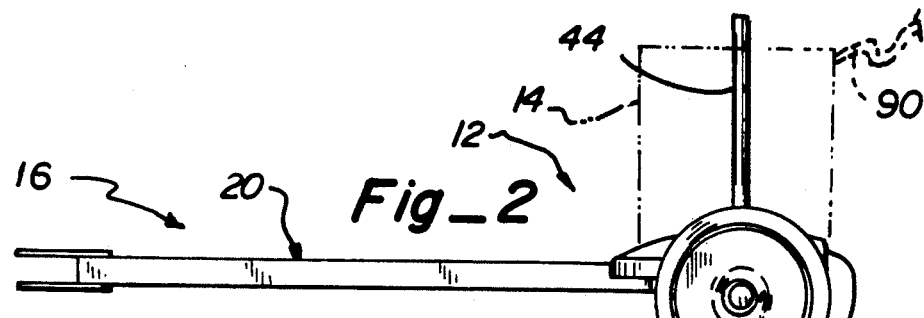
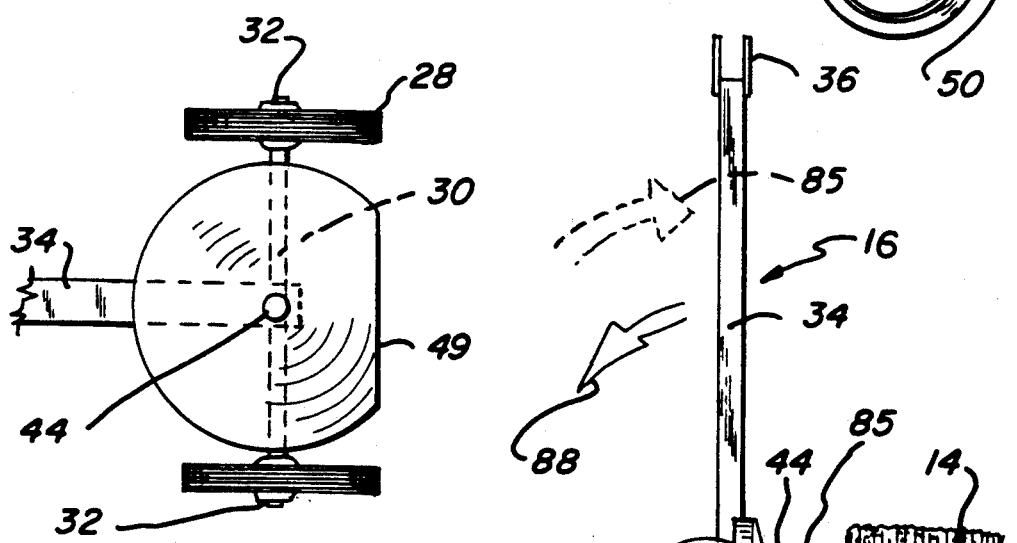
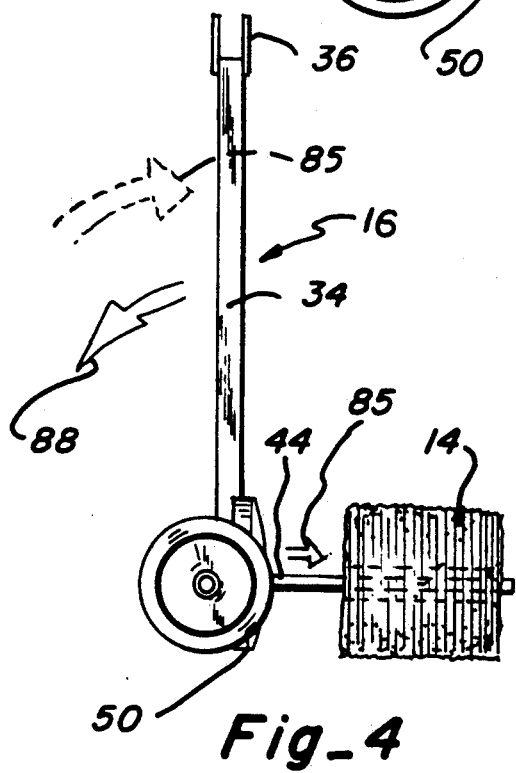

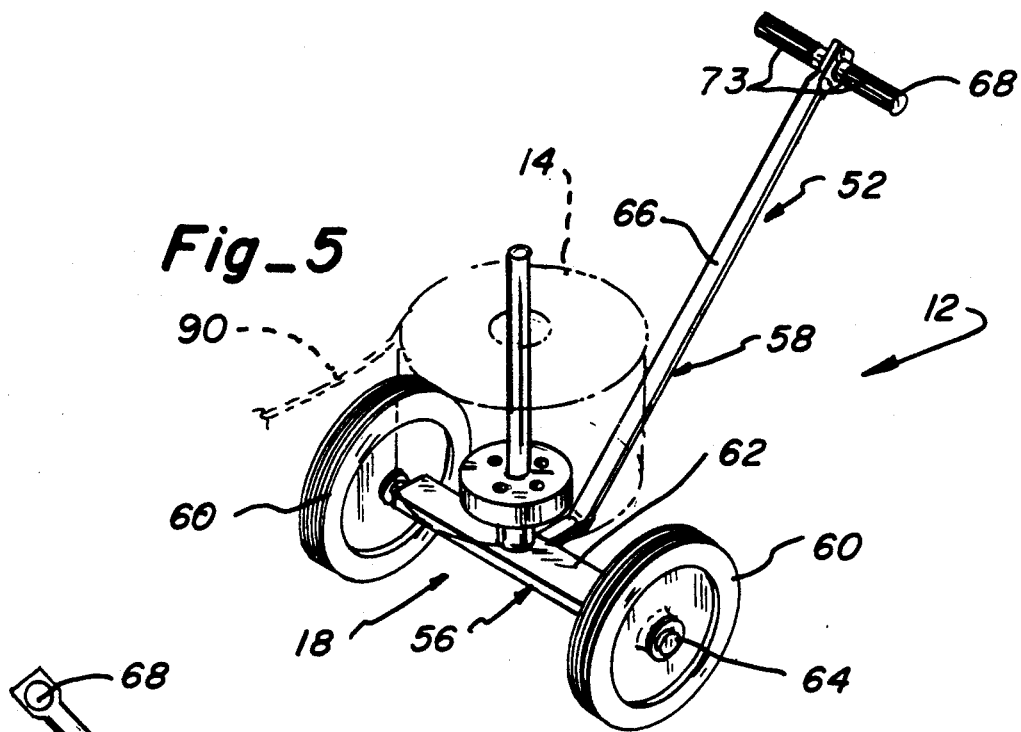
Fig_5
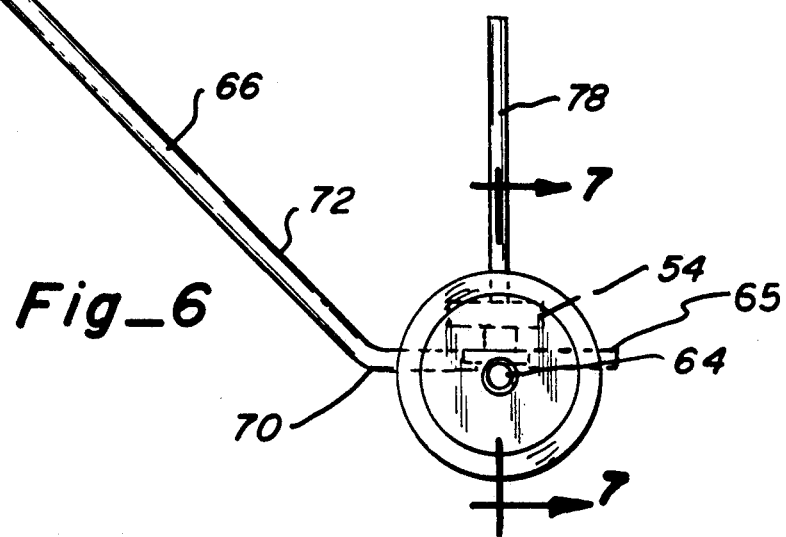
Fig_6
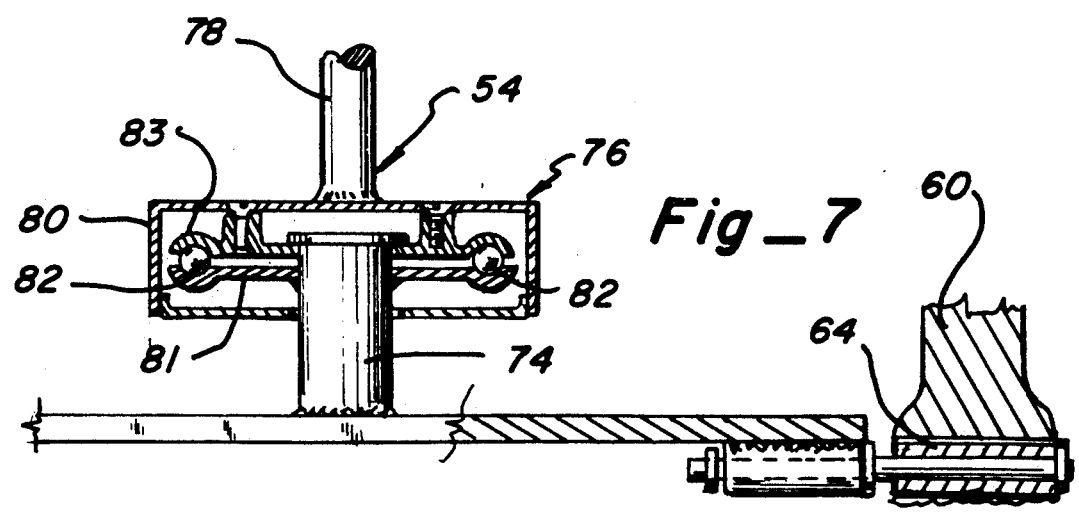
Fig_7

SINGLE WIRE DISPENSING ASSEMBLY

PRIOR ART

A patent search was not conducted specifically on a single wire dispensing assembly although a patent application being a Continuation-In-Part, Ser. No. 563,598, now U.S. Pat. No. 5,042,737, filed Aug. 6, 1990 and a patent search on an invention entitled "Multiple Wire Dispensing Assembly" revealed the following United States Patents:

| U.S. Pat. No. | Invention | Inventor |
| --- | --- | --- |
| 2,789,778 | WIRE DISPENSER | A. A. Zogg et al |
| 3,000,588 | MULTIPLE REELING DEVICE | S. A. Brady |
| 3,107,878 | MULTIPLE REEL CARRIER | H. B. Wong |
| 3,934,655 | HYDRAULIC POST SETTING AND WIRE DISPENSING APPARATUS | Bobby A. Whistle |
| 4,008,862 | BALE UNROLLING DEVICE | Raymond G. Wilmes |
| 4,208,021 | FENCING WIRE DISPENSER | John R. Wall |

Numerous other patent references were cited in an Office Action dated Feb. 12, 1990 in the applicant's parent application, Ser. No. 391,247, filed Aug. 9, 1990 (now abandoned) but those references, not listed above, are not deemed pertinent to applicant's claimed invention.

ANALYSIS

The Wong patent discloses a multiple reel carrier mounted on a wheelbarrow type structure and having reel compensating features and separate brake structures.

The Brady patent discloses a rather elaborate trailer for unrolling heavy rolls of wire used in electrical power lines and has means to use gear and chain drives to insure the proper and accurate dispensing of the wire from the spools.

The Wall patent discloses a plurality of stacked coil members utilized for the same function but is substantially different structurally.

The Whistle patent discloses a rather elaborate post setting and wire dispensing apparatus attached to a tractor structure.

The Zogg et al patent teaches a wire dispensing structure attached to the three-point hitch on a farm tractor having pairs of wire spools which are rotated in opposite directions to act against each other as a brake when the tractor is stopped. This is a primary reference in rejection of the claims in applicant's parent application.

PREFERRED EMBODIMENT OF THE INVENTION

In one preferred embodiment of this invention, a single wire dispensing assembly includes two embodiments being 1) a hitch pull wire dispensing assembly; and 2) an operator pull wire dispensing assembly. The hitch pull wire dispensing assembly includes a trailer hitch connector assembly having a spindle support assembly mounted thereon. The trailer hitch connector assembly includes an axle and wheel support assembly connected to a trailer hitch assembly which, in turn, is connectable to a truck or tractor hitch member in a conventional manner. The axle and wheel support assembly is provided with spaced wheel members interconnected by an axle member and resembles a conventional wheel/axle structure. The trailer hitch assembly includes an elongated hitch tongue member connected at one end to the support axle member and, at an opposite end, having a hitch connector assembly which is provided with means for connecting to the cooperating hitch member on a tractor or pick-up truck. The spindle support assembly is provided with a spool support disc having an upright support anxle or shaft positioned centrally and extended upwardly therefrom. The spool support disc is provided with 1) an upper concave surface to receive and support a spool of wire thereon; and 2) a cut-off disc section for ease of loading the spool of wire thereon.

The operator pull wire dispensing assembly embodiment is provided with a handle and wheel support assembly connected to a spindle support assembly. The handle and wheel support assembly includes an axle and wheel support assembly having a main handle assembly connected thereto. The axle and wheel support assembly is of a conventional nature having a spaced set of wheel members interconnected by a support axle or plate member. The main handle assembly includes an inclined handle member having one end connected to the support plate and another end is provided with a grip handle member. The main handle assembly is operable to be pushed or pulled manually by the operator thereof. The spindle support assembly includes 1) a support shaft mounted on the support plate; 2) a bearing assembly mounted on the support shaft; and 3) an upright support axle or shaft extended upwardly from the bearing assembly and operable to receive a spool of wire thereon. The bearing assembly is provided with a bearing housing having ball bearing members therein. The bearing housing is operable to receive the spool of wire mounted thereon about the upright support shaft for ease of rotation and removing a strand of wire from the spool of wire. The main handle assembly is operable to be moved upwardly for ease of loading the spool of wire thereon and tilted downwardly for movement by manual means.

OBJECTS OF THE INVENTION

One object of this invention is to provide a single wire dispensing assembly which is readily attachable to a trailer hitch member on a conventional farm tractor or truck and operable to receive a spool of wire thereon for ease of unraveling during construction of a fence post and wire assembly.

Another object of this invention is to provide a single wire dispensing assembly including a trailer hitch connector assembly with an axle and wheel support assembly connected to a trailer hitch assembly and provided with a spindle support assembly thereon to receive a spool of wire for dispensing a single strand of wire therefrom for ease of attaching to respective, spaced fence posts.

One other object of this invention is to provide a single wire dispensing assembly including a spindle support assembly mounted on a trailer hitch connector assembly and the spindle support assembly includes a spool support disc having a cut-off disc section operable to permit easy loading of a spool of wire on the spindle support assembly.

One further object of this invention is to provide a single wire dispensing assembly including an operator pull wire dispensing assembly embodiment having a handle and wheel support assembly interconnected to a spindle support assembly, the spindle support assembly includes a bearing assembly with an upright support shaft thereon and the bearing assembly provides for ease of rotation of a spool of wire thereon for dispensing a strand of wire for construction of a fence post and wire assembly.

Another further object of this invention is to provide a single wire dispensing assembly including an operator pull wire dispensing assembly having a handle and wheel support assembly which includes a main handle assembly readily usable by an operator to push and pull the entire structure without requiring an external power supply such as a farm tractor or pick-up truck.

Still, one other object of this invention is to provide a single wire dispensing assembly which is readily attachable to a conventional farm tractor or pick-up truck hitch member; easily pulled manually by an operator thereof; easy to use; sturdy in construction; economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a perspective view of a hitch pull wire dispensing assembly embodiment of the single wire dispensing assembly of this invention;

FIG. 2 is a side elevational view of the hitch pull wire dispensing assembly embodiment illustrating a spool of wire thereon in dotted lines;

FIG. 3 is a fragmentary top plan view of the hitch pull wire dispensing assembly embodiment of this invention;

FIG. 4 is a side elevational view of the hitch pull wire dispensing assembly embodiment of this invention similar to FIG. 2 except having a trailer hitch assembly in a vertical position illustrating loading a spool of wire thereon;

FIG. 5 is a perspective view of an operator pull wire dispensing assembly of the single wire dispensing assembly of this invention illustrating a spool of wire thereon in dotted lines;

FIG. 6 is a side elevational view of the operator pull wire dispensing assembly of this invention; and FIG. 7 is an enlarged fragmentary sectional view taken along line 7—7 in FIG. 6.

The following is a discussion and description of preferred specific embodiments of the single wire dispensing assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIGS. 1 and 2, a single wire dispensing assembly of this invention, indicated generally at 12, is utilized to receive thereon a spool of wire 14 for dispensing a strand of wire therefrom for building a fence post and wire assembly.

The single wire dispensing assembly 12 as illustrated herein consists of two embodiments being 1) a hitch pull wire dispensing assembly 16; and 2) an operator pull wire dispensing assembly 18.

The hitch pull wire dispensing assembly 16 includes a trailer hitch connector assembly 20 having a spindle support assembly 22 operable to receive the spool of wire 14 mounted thereon.

The trailer hitch connector assembly 12 includes 1) an axle and wheel support assembly 24; and 2) a trailer hitch assembly 26 connected to the axle and wheel support assembly 24.

The axle and wheel support assembly 24 is a conventional type structure having a pair of spaced wheel members 28 interconnected by a support axle member 30. Respective bearing members 32 are mounted between the wheel members 28 and the support axle member 30 to provide for free rotation of the wheel members 28 similar to most trailer wheel axle structures.

The trailer hitch assembly 26 includes an elongated trailer hitch tongue 34 of square shape in transverse cross section being secured at one end to the support axle member 30 and at the opposite end having a hitch connector assembly 36 mounted thereon.

The hitch connector assembly 36 is provided with a pair of spaced parallel connector plates 38, each having a pin connector hole 40 therethrough. The aligned pin connector holes 40 are operable to receive a clevis or lock pin (not shown) therethrough for releasably attaching in a conventional manner to a hitch member on a farm tractor or pick-up truck member.

The spindle support assembly 22 includes a spool support disc 42 having an upright support axle or shaft 44 connected centrally thereto and extended vertically therefrom. The spool support disc 42 is provided with an upper support surface 48 of concave shape and having one portion thereof provided with a cut-off disc section 49. The cut-off disc section 49 is provided with a flat support surface 50 for spool loading support in a manner to be explained.

The rearward support surface of the cut-off disc section 49 is operable to rest on a ground surface as noted in FIG. 4 for loading and unloading the spool of wire 14.

A forward portion of the spool support disc 42 is provided with a notch section 51 to be placed about and secured to an adjacent portion of the hitch tongue member 34.

The upright support axle or shaft 44 is operable to receive the spool of wire 14 thereon as noted in FIGS. 2 and 4.

The second embodiment of the operator pull wire dispensing assembly 18 includes a handle and wheel support assembly 52 having a spindle support assembly 54 mounted thereon. The handle and wheel support assembly 52 includes 1) an axle and wheel support assembly 56; and 2) a main handle assembly 58 connected to the axle and wheel support assembly 56.

The axle and wheel support assembly 56 is provided with a pair of spaced wheel members 60 interconnected by a support axle member or plate 62 having bearing members 64 at outer ends on which the respective wheel members 60 are mounted.

As noted in FIG. 6, a spool loading plate 65 may be used, connected to and extended outwardly from the support axle plate 62, for support during loading a spool of wire 14 thereon in a manner to be explained.

The main handle assembly 58 includes an inclined handle member 66 having a grip handle member 68 secured to an upper outer end thereof.

The inclined handle member 66 is provided with a lower arcuate section 70 which is secured to a central portion of the support axle plate 62 and a main upwardly inclined support section 72.

The grip handle member 68 is provided with laterally extended grip sections 73 and attached to the upper outer end of the main support section 72 of the inclined handle member 66. The grip sections 73 may have a rubber coating thereon for ease of grasping and moving.

The spindle support assembly 54 includes 1) an upright support shaft 74 having a lower portion secured as by welding to the support axle plate 62; 2) a bearing assembly 76 mounted on an upper end of the support shaft 74; and 3) an upright support axle or shaft 78 secured to a center portion and extended upwardly from the bearing assembly 76.

As noted in FIG. 7, the bearing assembly 76 includes a main bearing housing 80 having ball bearing members 82 mounted within. The bearing housing 80 includes 1) a lower stationary plate 81 secured to the support shaft 74; and 2) a rotatable plate 83 supported on the ball bearing members 82 and secured to the upright support axle 78.

Therefore, it is obvious that the bearing assembly 76 is operable in a conventional manner to have the movable plate 83 and interconnected support axle 78 freely rotatable on the ball bearing members 82 to achieve ease of rotation thereon. This is important when placing the heavy spool of wire 14 thereon for unraveling a strand of wire 90 therefrom during a fence building operation.

USE AND OPERATION OF THE INVENTION

In the use and operation of the single wire dispensing assembly 12 of this invention, it is noted with the embodiment of the hitch pull wire dispensing assembly 16 that the trailer hitch assembly 26 and, more specifically, the hitch connector assembly 36 can be connected to a farm tractor or truck hitch member and connected through a lock clevis pin or mounted through the pin connector holes 40.

Prior to connection to the farm tractor or pick-up truck hitch member, the hitch pull wire dispensing assembly 16 is first moved to position the hitch tongue member 34 in a plane as noted by an arrow 85 in FIG. 4 to be supported on the support surface 50. In this position, it is obvious that the entire hitch pull wire dispensing assembly 16 ca be moved horizontally. This horizontal movement is used to place the upright support axle 44 through a center opening in the spool of wire 14 as noted in FIG. 4.

Next, the hitch pull wire dispensing assembly 16 with the spool of wire 14 mounted thereon is movable in a direction noted by arrow 88 in FIG. 4 to the loaded condition as shown in FIG. 2. In this condition, it is noted that the trailer hitch assembly 36 is connected to a conventional hitch member on a farm tractor or truck structure.

Then, the entire hitch pull wire dispensing assembly 16 with the spool of wire 14 thereon is then moved to a desired fence building operation whereupon a plurality of spaced fence posts have been installed.

The wire strand 90 can be pulled from a spool of wire 14 by hand and the friction between the spool of wire 14 and the upper support surface 48 of the spool support disc 42 provides a braking action on pulling the strand of wire therefrom.

An alternate desirable means would be to attach the strand of wire 90 to one fence post in a secure manner and then pull the entire hitch pull wire dispensing assembly 16 by use of the farm tractor or truck and automatically dispense the strand of wire 90 adjacent to the other fence posts for subsequent attachment thereto.

In the second embodiment of this invention, being the operator pull wire dispensing assembly 18, as noted in FIGS. 5-7, inclusive, it is obvious that the handle and wheel support assembly 52 with the spindle support assembly 54 mounted therein can be tilted to a position to place the upright support shaft 78 in a generally horizontal position similar to the first embodiment noted in FIG. 4. This places vertical support on an outer end of the loading support plate 65.

In this position, it is obvious then that the entire operator pull wire dispensing assembly 18 can be moved laterally to place the upright support shaft 78 through an opening in the center of a spool of wire 14 resting on a ground surface.

On full insertion of the upright support shaft 78 within the spool of wire 14, it is obvious that the inclined handle member 66 is grasped on the grip handle member 68 and, more particularly, the grip sections 73 to move the entire structure to a generally upright position as noted in FIGS. 5 and 6.

In this position, the operator can utilize the main handle assembly 58 and, more specifically, the grip handle member 68 to move the entire operator pull wire dispensing assembly 18 to a fence building operation next to installed upright spaced fence posts. Thereupon, the strand of wire 90 is securely attached to a fence post at a desired level for building a fence post and wire assembly.

Next, the operator can grasp the grasp handle member 68 and move the entire operator pull wire dispensing assembly 18 along a given path adjacent to upright fence posts. It is noted that, due to the bearing assembly 76, this then allows the strands of wire 90 to be easily trailed from the spool of wire 14.

On unraveling of the wire strand 90 from the respective spool of wire 14, it is obvious the operator would then sequentially attach the wire strands 90 to the respective adjacent fence posts to continue a fence post and wire assembly building operation.

An important feature of this invention is the use of the spool support disc 42 having the upper concave support surface 48 of a curved nature so as to support and contact the lower surface of the spool of wire 14 mounted thereon. This achieves a frictional contact so that when the wire strands 90 are being pulled from the frictional contact with the upper concave support surface 48 the spool of wire 14 is prevented from freely rotating thereabout which overcomes many problems of the prior art structures.

It is noted that both embodiments of the invention, being wire dispensing assemblies 16 and 18, could be provided with releasable connector means so that the trailer hitch assembly 26 and the main handle assembly 58 could be interchangable. This would allow each embodiment to be conveyed by the operator or moved by connection to a farm tractor or truck hitch member.

Additionally, the bearing assembly 76 could be releasably mounted on the spindle support disc 42 about the support shaft 44 of the hitch pull wire dispensing assembly 16 if a bearing support to the spool of wire 14 is desired.

The operator pull wire dispensing assembly provides an economical structure that can be utilized without an external power source such as a farm structure or pickup truck allowing the operator to achieve his own fence post and wire assembly building operation.

Also, both embodiments of this invention provide for the easy tilt feature for loading a spool of wire 14 on the respective spindle support assemblies 22, 54.

It is noted that the single wire dispensing assembly embodiments of this invention are sturdy in construction; easy to move; easy to operate; and substantially maintenance free.

While the invention has been described in conjunction with preferred specific embodiments thereof, it will be understood this description is intended to illustrate and not to limit the scope of the invention, which is defined by the following claims:

We claim:

1. A single wire dispensing assembly attached to a hitch assembly, comprising:

a) an axle and wheel support assembly connected to a trailer hitch assembly operable to be releasably connected to the hitch assembly;
b) a spindle support assembly connected to said axle and wheel support assembly which is supported on a ground support surface;
c) said spindle support assembly includes a spool support disk and a support shaft secured to said spool support disk and extended upwardly therefrom;
d) said spool support disk includes a cut-off section at an edge having a flat support surface;
e) said axle and wheel support assembly includes a support axle member having wheel members mounted on respective outer ends of said support axle member;
f) said flat support surface extended in a plane parallel to a longitudinal axis of said support axle member and forwardly thereof at a distance equal to a distance from said longitudinal axis of said support axle member to the ground support surface; and
whereby said spindle support assembly contacts and is supported on said ground support surface by said flat support surface when said support shaft is moved forwardly to extend horizontally to the ground support surface.

* * * * *